Jan. 25, 1938.  M. E. GIRODIN  2,106,633
MACHINE FOR THE MANUFACTURE OF BISCUITS
Filed Feb. 26, 1937  2 Sheets-Sheet 1
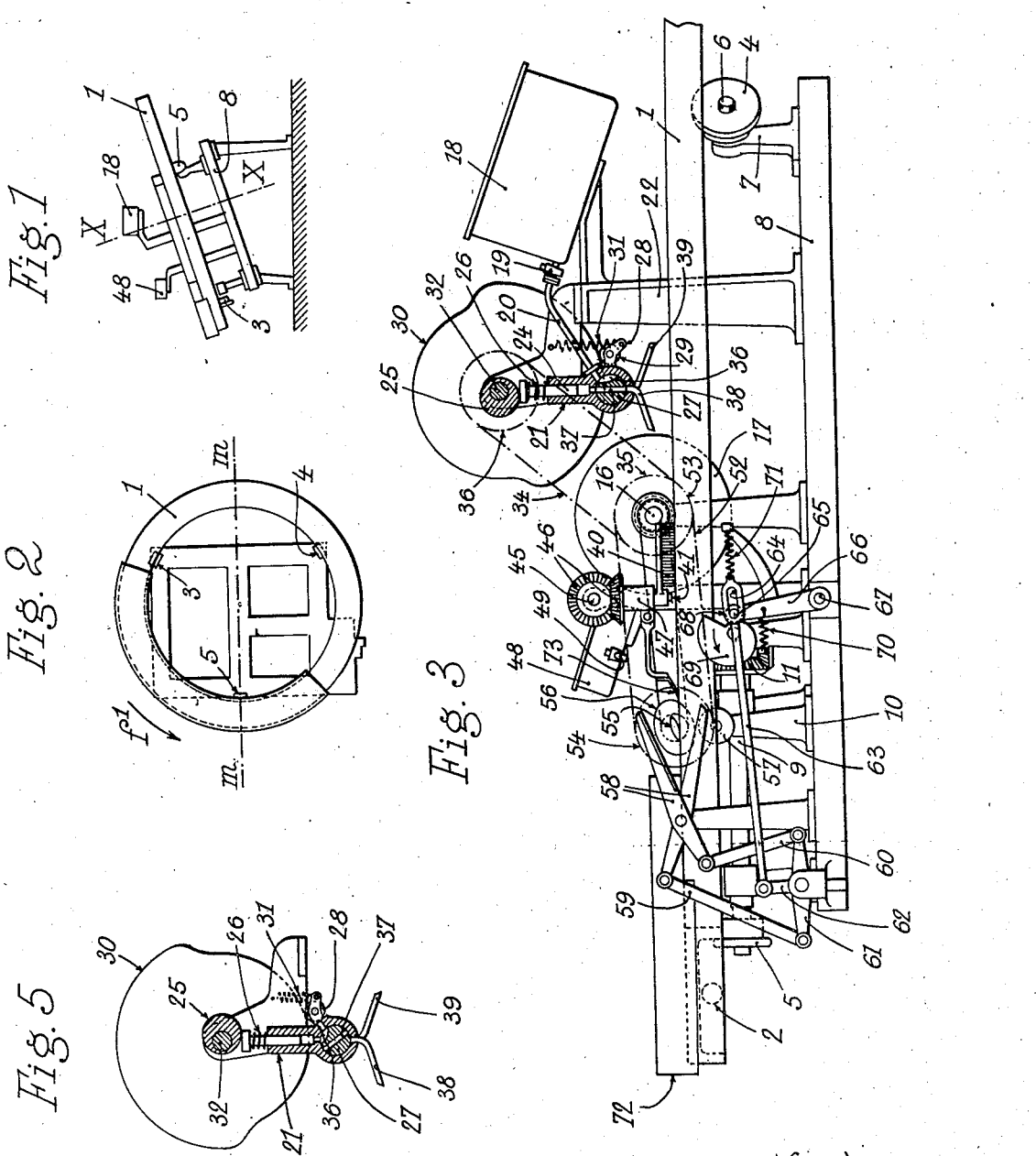
Marius Ernest Girodin
INVENTOR
his ATTY Jan. 25, 1938.  M. E. GIRODIN  2,106,633
MACHINE FOR THE MANUFACTURE OF BISCUITS
Filed Feb. 26, 1937   2 Sheets-Sheet 2
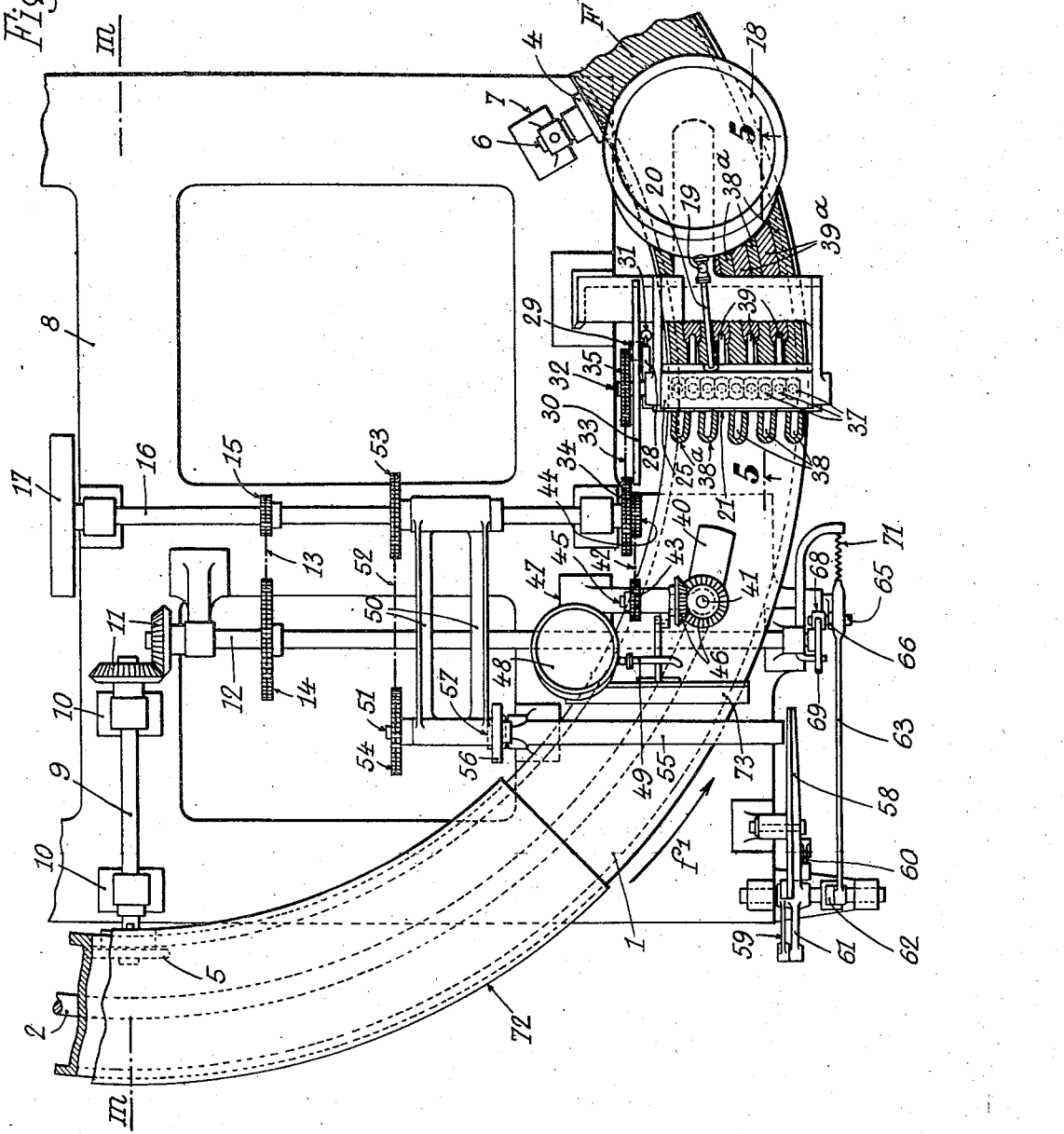
Marius Ernest Girodin
INVENTOR Patented Jan. 25, 1938

2,106,633

UNITED STATES PATENT OFFICE 2,106,633

MACHINE FOR THE MANUFACTURE OF BISCUITS

Marius Ernest Girodin, Quimper, France

Application February 26, 1937, Serial No. 127,844
In France March 6, 1936

7 Claims. (Cl. 107—1)

Certain biscuits are produced manually by spreading a semi-liquid paste upon an inclined heating plate, and in then winding the film obtained after baking, upon a suitable knife-blade. The present invention has for its object to provide a machine for the automatic manufacture of such biscuits.

The machine for carrying out the said process is chiefly distinguished by the fact that it comprises in combination a movable heating surface, a feeding device for the paste which comprises several small pumps adapted to deliver the paste through one or more nozzles, each of which produces a strip of paste upon the heating surface, a straight rotatable blade located slightly above the moving heating surface, said blade being inclined from the direction of movement of said heating surface, in such way as to helically wind the film of baked paste and form a continuous tube and shears having a rapid movement, mounted at the end of said rotatable blade, and adapted to cut up into sections said tube.

The heating surface preferably consists of a rotatable inclined ring.

According to other features of the invention the machine further comprises a scraper for detaching the film of baked paste from the heating surface, a rotatable brush which serves to spread a fatty substance upon the heating surface, and a heating tunnel.

In the accompanying drawings, which are given solely by way of example:

Fig. 1 is an elevational view, of a very diagrammatic nature, of a machine in conformity with the invention, this view being intended principally to show the inclination of the heating surface.

Fig. 2 is a corresponding plan view, but in this figure as in the two following figures, the heating surface is supposed to be brought to the horizontal position.

Fig. 3 is a partial elevational view on a larger scale.

Fig. 4 is a corresponding plan view.

Fig. 5 is a partial vertical section on the line 5—5 of Fig. 4, through one of the feeding devices.

In the embodiment herein represented, the heating surface consists of the upper surface, which is trimmed perfectly plane, of a flat ring 1 having a U section (Figs. 3—4), the flanges of which are directed downwardly. Between said flanges is mounted a heating gas burner 2 (Figs. 3 and 4). The ring 1 is rotatable on an inclined axis X—X (Fig. 1). The line mm (Figs. 2-4) represents the line of the heating surface having the greatest slope.

The ring 1 is mounted on three rollers 3—4—5 (Figs. 1 to 4). The rollers 3 and 4 are loose on their axles 6 (Figs. 3—4), which are secured to supports 7 resting upon an inclined base 8. The roller 5, which acts by friction to give to the ring 1 a movement of rotation in the direction of the arrow $f^1$, is keyed to a shaft 9 (Figs. 3—4) which is rotatable in supports 10 secured to the base 8.

Shaft 9 is driven by means of a bevel gearing 11, by a shaft 12. This shaft is driven—through a transmission consisting of a chain 13 and chain wheels 14 and 15 (Fig. 4)—by a main shaft 16 carrying a driving pulley 17.

Above the heating surface 1, and practically at the level of its horizontal diameter, and in the ascending region, is located a receptacle 18 containing paste (Figs. 1—3—4). The said receptacle, which is vertical (Fig. 1), is connected by a cock 19 and a pipe 20 to the main body of a feeding device 21. The said paste receptacle and feeding device are secured to a support 22 (Fig. 3) mounted on the base 8.

The said feeding device comprises (Figs. 3—4—5) a set of small pumps the pistons 24 of which (Fig. 3) are driven for example by an eccentric 25 extending along the whole length of the row of pistons and with which they are held in contact by springs 26. The feeding device further comprises a cylindrical rotary-valve 27 to which is keyed a lever 28 provided with a roller 29 which is held in contact with a cam 30 by a traction spring 31. The cam 30 and the eccentric 25 are keyed to a shaft 32 which is driven from the shaft 16, for instance through a transmission consisting of a chain 33 and chain wheels 34—35.

The rotary-valve 27 comprises:

On the one hand a channel 36 which connects the pipe 20 to the pumps when the lever 28 is at the top of its stroke;

And on the other hand, diametrical holes 37 which connect the pumps with nozzles 38—39 when the lever 28 is at the bottom of its stroke.

The nozzles 38 are directed to one side of the feeding device, for instance to the rear, and the nozzles 39, which are located in the spaces between the nozzles 38, are directed to the opposite side. The strips of paste which are fed out by the nozzles 38—39 are represented by hatched portions 38ª (Fig. 4), and the strips which are fed out by the nozzles 39 are represented at 39ª and are hatched in a contrary direction.

On the upward side of the feeding device with reference to the direction of rotation of the ring 1, is located a brush 40 (Figs. 3—4) mounted on a shaft 41 which is perpendicular to the ring 1.

This shaft 41 is driven by the main shaft 16, for instance through a transmission comprising a chain wheel 44, a chain 42, a chain wheel 43 mounted on an intermediate shaft 45, and a bevel gearing 46. The shafts 41 and 45 rotate in a support 47 upon which is mounted a vertical tank 48 provided with a cock 49 which is situated above the ring 1. Said tank contains the fatty material which is usually employed to prevent the paste from adhering to the baking plates.

To the shaft 16 is pivoted the end of a member 50 (Fig. 4). In the other end of said member is rotatable a shaft 51 (Fig. 4) which is parallel to the shaft 16 and is driven by the latter, for instance through a transmission consisting of a chain 52 and chain wheels 53—54. Above the ring 1, the shaft 51 extends in the form of a blade 55 having a willow-leaf section; it also carries a cam 56 the outline of which is a curve parallel to the cross section of the blade 55. The said cam is in contact with a roller 57 the axle of which is mounted on the base.

Adjacent the end of the blade 55 are mounted shears 58 which are actuated by links 59—60, levers 61—62, and a rod 63 having a slotted end 64 in which is engaged the crank-pin 65 of a lever 66 oscillating about an axle 67 which is secured to the base 8. The said lever 66 carries a roller 68 which is held in contact with a cam 69 by a strong traction spring 70. The cam 69 is keyed to the shaft 12 and rotates in the direction of the arrow (Fig. 3).

A weak spring 71 acts upon the link 63 in such way as to ensure the opening of the shears 58.

A radiator of the electric, gas or other type is situated under a cover 72 forming a tunnel and covering a part of the ring 1.

A scraper 73 (Figs. 3–4), pivoted to the support 47, is applied against the ring 1 between the blade 55 and the brush 40.

The operation is as follows: After the semiliquid paste has been placed in the receptacle 18, and the fatty material in the tank 48, and when the heating of the ring 1 has become sufficient, the cock 49 of the tank 48 is opened, and then the cock 19 of the tank 18, so that the paste will not flow upon the ring 1 except when this latter has been regularly spread with fatty material by the brush 40.

The feeding device 21 then acts in the following manner. The upward stroke of the piston 24, under the action of the eccentric 25 and the springs 26, takes place when the rotary valve 27 is in the position shown in Fig. 5, and the paste is withdrawn by the pistons. During the downward stroke, the valve has the position shown in Fig. 3, and the paste is delivered to the nozzles 38—39. The paste discharged from the nozzles, due to its fluidity, will spread out in the form of continuous strips 38a, leaving spaces between them which are covered by the paste flowing from the nozzles 39 and forming strips 39a. The ring is thus finally covered with a film F (Fig. 4) which is continuous both in the direction of the length and the width, owing to the fluidity of the paste. The paste then begins to dry in the open part, and the baking is completed when it passes through the tunnel 72. After it has proceeded beyond the blade 55, the end of the film is detached from the ring 1 by the scraper 73 and is then manually engaged by means of a spatula around the blade 55 in order to commence its winding. The machine then works automatically and in a continuous manner. The ratio of the speeds of the ring 1 and of the blade 55 is given such value that a slight traction will be produced upon the film. Owing to the inclination of the blade 55, the film of baked paste slides along said blade during the winding which is thus helical, hence producing a continuous tube whose internal cross-section is that of the blade 55.

Said tube proceeds from the end of the said blade into the shears 58 which cut it up into sections by a very rapid movement which is obtained as follows: Starting from the time at which the different parts have the position shown in Figure 3, the cam 69, turning in the direction of the arrow, acts upon the roller 68 and the lever 66, while stretching the spring 70. The spring 71 draws the link 63 in the same movement; the opening of the shears 58 increases until the roller 68 has moved over the whole of the inclined part of the cam 69. The lever 66 then returns abruptly to the position shown in Fig. 3, moving the shears towards their closing position, which they attain by reason of the kinetic energy acquired and by means of the slotted part of the rod 63. The spring 71 at once brings back this rod 63 and also the shears, to the position shown in Figure 3. The tube of baked paste is thus cut up during its rotation, without any damage to the parts adjacent the cut.

Each section thus forms a biscuit.

Obviously, the invention is not limited to the embodiment herein described and represented, which is given solely by way of example.

Having now described my invention what I claim as new and desire to secure by Letters Patent is:

1. A machine for the manufacture of biscuits of the type described comprising a movable heating surface, paste delivering means adapted to deliver paste upon said heating surface so as to form a continuous film of paste, means adapted to helically wind said film of paste after baking so as to form a tube and means adapted to cut up said tube into sections.

2. A machine for the manufacture of biscuits of the type described comprising a movable heating surface, a first series of spaced nozzles adapted to deliver paste upon said heating surface so as to form a first series of spaced parallel continuous strips of paste, a second series of spaced nozzles located at a distance behind said first series of nozzles in the direction of travel of said heating surface and adapted to deliver paste so as to form a second series of spaced parallel continuous strips of paste between the strips of said first series of strips, said second series of strips forming by union with said first series of strips a continuous film of paste, means adapted to helically wind said film of paste after baking so as to form a tube and means adapted to cut up said tube into sections.

3. A machine as claimed in claim 1, in which said heating surface consists of a flat rotatable ring the axis of which is inclined with reference to the vertical.

4. A machine as claimed in claim 1, in which said means adapted to helically wind said film of paste consists of a rotatable straight blade which is parallel with said heating surface and is oblique with reference to the direction of travel of said heating surface.

5. A machine as claimed in claim 1, in which said means adapted to helically wind said film of paste consists of a rotatable straight blade which is parallel with said heating surface and is oblique with reference to the direction of travel of said heating surface and further comprising a scraper engaging said heating surface in front of said rotatable straight blade whereby the film of paste is detached from said heating surface.

6. A machine for the manufacture of biscuits of the type described, comprising a flat inclined rotatable heating ring, a first series of nozzles adapted to deliver paste upon said heating ring so as to form a first series of spaced parallel continuous strips of paste, a second series of spaced nozzles located at a distance behind said first series of nozzles in the direction of travel of said heating ring and adapted to deliver paste upon said heating ring so as to form a second series of spaced parallel continuous strips of paste between the strips of said first series of strips, said second series of strips forming by union with said first series of strips a continuous film of paste, a straight rotatable blade parallel with the upper surface of said heating ring and oblique with reference to the tangent to said heating ring at the point where is situated said rotatable blade, whereby, when said film of paste is engaged about said rotatable blade, it is wound helically about said rotatable blade in form of a tube and slides along the same, shears having an opening and closing movement arranged at the end of said rotatable blade so that said tube escaping from said rotatable blade proceeds through said shears whereby said tube is cut up into sections each of which constitutes a biscuit.

7. A machine as claimed in claim 6, in which the speed of rotation of said rotatable blade and the speed of rotation of said heating ring are such that when the film of paste is engaged about said rotatable blade, this latter exerts a slight traction upon the film of paste resting upon said rotatable ring.

MARIUS ERNEST GIRODIN.